Nov. 6, 1962  R. P. WOODRUFF  3,061,842
DEODORANT DISPENSER
Filed Aug. 9, 1960

INVENTOR.
Roy P. Woodruff
BY
Townsend and Townsend
attorneys

United States Patent Office 3,061,842
Patented Nov. 6, 1962

3,061,842
DEODORANT DISPENSER
Roy P. Woodruff, 927 Amador St., Vallejo, Calif.
Filed Aug. 9, 1960, Ser. No. 48,411
5 Claims. (Cl. 4—225)

This invention relates to deodorant dispensers for use in flush tanks and the like, and more particularly to deodorant dispensers which meter a deodorant saturated liquid into the flush tank and are recharged during each cycle of operation.

The principal object of the present invention is to provide a deodorant dispenser which closely controls the amount of deodorant liquid dispensed each time the flush tank is cycled.

Another object of the invention is to provide a dispenser which utilizes crystal deodorants, is of simple construction, and requires a minimum of attendance.

The prior art discloses numerous deodorizing and disinfectant dispensers of one sort and another, all having as their broad object to provide means for deodorizing or disinfecting toilet bowls, urinals and the like. None of these prior dispensers have met the test of providing a simple dispenser which meters the amount of deodorant liquid supplied during a cycle of operation of a flush tank and which is relatively independent of the time lag between the lowering of the water level in the tank and the refilling of the tank.

For example, numerous prior art deodorant dispensers utilize valves controlled by floats of one sort or another to permit a deodorant liquid to flow into the flush tank during the period of time the water level fails to maintain the float valve closed. While these dispensers may work satisfactorily enough, they dispense unnecessary and/or uncontrolled amounts of deodorants because they directly depend upon the length of time the valve is open. Other dispensers employ air columns to force the deodorant liquid out of a dispensing container. Where these latter types of dispensers employ deodorant crystals and it is necessary to recharge them with water at least occasionally, the same tube or opening is used. The result is that the liquid dispensed during each cycle of operation is that which is least saturated with deodorant from the dissolving crystals. Also, the amount of liquid replaced may vary depending upon time of cycling, size of tube, etc.

In accordance with the present invention, means are provided to automatically dispense a preselected amount of deodorant saturated liquid from a dispenser employing deodorant crystals each time the flush tank is filled and to replace the dispensed liquid with an equal amount of water as the flush tank is emptied. These functions are attained in the present invention by employing independent dispensing and recharging means which by their construction permit separation of the locations of dispensing and recharging and also act to assure that equal increments of water are added.

The objects and advantages of the present invention are attained by providing a deodorant dispensing device cooperating with a reservoir which stores water when the flush tank is filled for subsequent recharging of the dispenser. Cooperating with the reservoir and container are a dispensing tube, a one-way valve connecting the reservoir to the container and a drain tube disposed within the container. In operation, the air column pressure in the drain tube forces deodorant liquid out of the dispensing tube as the flush tank is filled and the partial vacuum pulled in the container and drain tube as the water is discharged from the tank operates the valve to refill the container from the reservoir.

A feature of the present invention pertains to the use of separate means cooperating with a dispenser container to recharge and dispense liquids.

Another feature of the invention pertains to a reservoir for storing water so that accurate recharging of the dispenser is assured.

Another feature of the invention pertains to the use of a reservoir for storing water when the flush tank is filled so that the partial vacuum established in the container as the water level drops may be employed to refill the dispenser.

Yet another feature relates to use the of a separate dispensing tube through which deodorant saturated liquid is forced outwardly as the water level in the flush tank rises to establish a positive pressure in the container.

Still another feature of the invention pertains to the combination in a dispensing device of a crystal container, means for creating a positive pressure or pulling a partial vacuum therein, a reservoir and means responsive to the partial vacuum to replace dispensed liquids from water in the reservoir, and independent means responsive to the positive pressure for dispensing liquid from the container.

Otherwise stated, a feature of the invention pertains to the combination of a closed container, a drain tube supported therein, an open reservoir, and recharging and dispensing means cooperating with the container and reservoir whereby the dispenser automatically and accurately dispenses deodorant saturated liquid and replaces the discharged liquid with an equal amount of water.

These and other objects, advantages and features of the present invention will be more fully understood when the following detailed description is read with reference to the drawings, in which.

Figure 1:
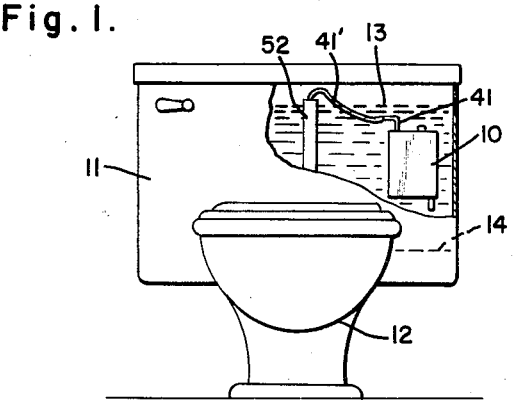
FIG. 1 is a front view of a flush tank and toilet with the tank partially cut away to show the operating position of a dispensing device constructed in accordance with the present invention.

The dispensing device 10 is shown in FIG. 1 to be supported on the rear wall of a flush tank 11 cooperating with a conventional toilet bowl 12. As illustrated there, the dispensing device 10 is supported vertically in the flush tank 11 such that the level 13 of the water when the tank 11 is full is at least above the top of the dispensing device 10 and the lowest level of the water, illustrated by dotted line 14, is below the dispensing device 10. As a practical matter, it is not necessary that the lowest water level 14 be completely below the dispensing device 10, it is enough that it be somewhat below the top of the device 10.

The dispensing device 10 can be seen (FIGS. 2 and 3) to comprise an enclosed container 21 having a removable cap or stopper 22 cooperating with an aperture in its top. An open drain tube 23 is vertically disposed interiorly of the container 21 with its upper end 26 terminating close to the top of the container 21 and its lower end 27 extending below the bottom thereof. A reservoir 31 (illustrated as rectangular in the figures, but may be of any shape as round, oval, square or rectangular) is formed in the top of container 21 and connected to the interior of container 21 by one-way valve 33.

Valve 33 may be constructed in a variety of ways, however, in the exemplary embodiment a valve seat 34 is formed in the lower surface of the reservoir 31 and a float ball 36 cooperates therewith whenever the liquid level in container 21 is sufficiently high. The ball 36 is retained in a cylindrical guide member 37 which cooperates with a transverse pin 38 to prevent the ball from falling out of the member 37. The valve 33 is normally maintained closed when the liquid level in the container 21 floats it against valve seat 34. Under the force of gravity, when the liquid level is sufficiently low, ball 36 falls against member 38 to interconnect the reservoir 31 and the interior of the container 21.

Figure 2:
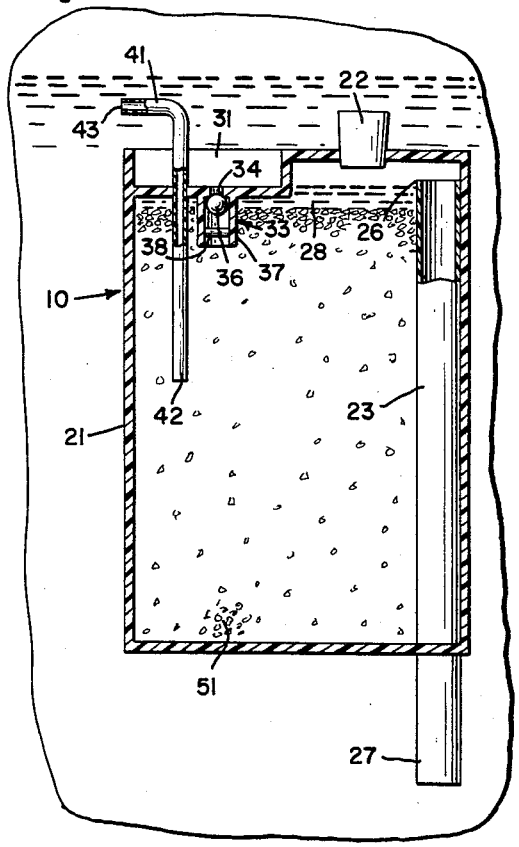
FIG. 2 is an enlarged side cross-section view of the present invention illustrating the arrangement of the parts; and, FIG. 3 is an enlarged end cross-section view of the present invention illustrating its exemplary attachment to a flush tank wall and the arrangement of the parts.
Figure 3:
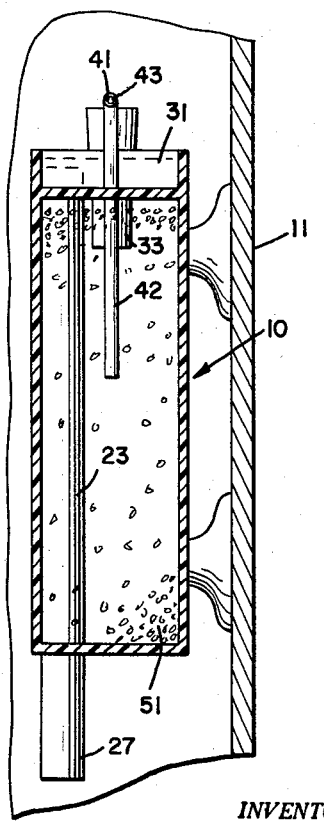

A dispensing tube 41 is depended through the reservoir 31 into the lower interior part of container 21. It is immaterial at what point the lower end 42 of dispensing tube 41 terminates, although it is desirable that it be sufficiently away from valve 33 to avoid dispensing incompletely saturated liquid. The deodorant fluid may discharge into the toilet tank water through tube 41 through its upper end 43; or a tube 41' may be connected from tube 41 to the toilet tank overflow 52, thus discharging the deodorant into the toilet bowl. The upper end of tube 41 may be placed below water level 13 (FIGS. 1 and 2) as illustrated, or it may be placed above the water level. If it is placed above the water level, there will be no mixing of fluids in the flush tank and the dispenser, as there could be if it is placed below the water level, as illustrated in FIGS. 1 and 2. However, it must be maintained at a higher level than the container 21 in order to prevent the establishment of a siphon effect during the operation of the dispensing device 10.

In operation, the stopper 22 is removed and container 21 filled with water soluble deodorant crystals 51 and water. The stopper 22 is replaced and the dispensing device 10 placed in the flush tank 11 as illustrated in FIG. 1. Since the water level 13 is over the top of reservoir 31, it is filled. When the flush tank 11 is emptied and the water level 13 falls toward level 14, the water contained in drain tube 23 falls and all water in the container 21 above the upper end 26 of the drain tube 23 discharges through the tube 23. As this water flows out end 27 of the tube 23, a partial vacuum is created in the container 21 which establishes a pressure differential between the filled reservoir 31 and the interior of container 21. The result is that ball 36 moves downward and a portion of the water in reservoir 31 passes into container 21 until hydrostatic equilibrium is established. Equilibrium is attained after the water passes below end 27 of drain tube 23 and the differential pressure is equalized.

As water flows into tank 11 to fill it and the water level moves upward beyond end 27 of drain tube 23 it compresses the air in the drain tube 23 and the upper part of container 21. This creates a positive pressure in container 21 and forces liquid out of dispensing tube 41 until the differential pressures are equalized. At this point, the water level will have risen to 13 and reservoir 31 will be refilled.

When the tank is next evacuated and the water level falls from 13 to 14, the lowering of the water level in drain tube 23 will recreate the partial vacuum interior of container 21 which will, in turn, cause float ball 36 to move downward so that water from reservoir 31 flows into container 21.

In every case, the partial vacuum pulled in the container 21 is directly dependent upon the amount of deodorant saturated liquid dispensed by way of dispensing tube 41. The reservoir 31 supplies an equal amount of replacement water to the container as the water level in the flush tank 11 is lowered. Naturally, as soon as the previously dispensed liquid is replaced, a condition of equilibrium is attained and ball 36 reseats on valve seat 34.

From the foregoing description of the operation, it can be seen that as the flush tank is filled a preselected amount of deodorant saturated liquid is discharged into the tank, and, as the level of water in the tank is lowered, the dispensed liquid is replaced by an equal amount of water from the reservoir. In this way, simple and effective means are provided to carefully control the amount of liquid dispensed.

Many of the dimensions and relation of parts of the present dispensing device are relatively uncritical, but a few relations and restrictions should be noted. For one thing, the amount of liquid dispensed during each cycle of operation will depend upon the compression of the air column in the drain tube and container and not upon the time during which the flush tank is empty, as is the case with many prior art dispensing devices. Second, the invention will operate quite satisfactorily even though the water level never falls below the bottom of the dispensing device, although the amount of liquid dispensed may be changed somewhat. Third, aside from the fact that the reservoir must be made sufficiently large to supply the necessary amount of water for recharging the dispensing device after each dispensing operation, it is not critical. Fourth, while the check valve illustrated is a float ball type, any one-way check valve would operate satisfactorily provided it is sensitive enough to a pressure differential between the reservoir and the interior of the tank. Fifth, the amount of liquid dispensed during each cycle of operation cannot be greater than the volume of water between the top of the drain tube and the level of the water in the container necessary to maintain the check valve closed. With the exemplary embodiment illustrated, this means that the volume of water in the space between end 26 and the level of water indicated by dotted line 28, which is just sufficient to maintain float ball 36 against valve seat 34, must exceed the amount dispensed during each cycle of operation so that air will not escape through check valve 33 and reservoir 31.

While the present invention has been described with respect to a particular embodiment of the present dispensing device, certain modifications should be apparent to those skilled in the art without departing from the scope of the invention. For this reason, the invention should only be limited to the extent of the appended claims.

What is claimed is:

1. A device cooperating with the flush tank of a toilet bowl or the like for dispensing a deodorant liquid comprising, in combination, a container including a supply of water soluble deodorant crystals and water, means to support the container in a flush tank whereby it is submerged when the tank is full and at least partially out of the water after the tank is discharged, means to establish a positive pressure and a partial vacuum alternately in said container in response to the level of the water in the tank, a reservoir in which water is stored each time the flush tank is filled, pressure sensitive means operable to connect said reservoir to said container, and dispensing means extending from a point below the lowest level of liquid in the container to a point above the top of said reservoir, said dispensing means dispensing a preselected amount of deodorant saturated liquid in response to the positive pressure and said pressure sensitive means being operated by the pressure differential when the partial vacuum is created to recharge the container with water previously stored in the reservoir.

2. A device cooperating with the flush tank of a toilet bowl or the like for dispensing a deodorant liquid in accordance with claim 1 wherein said reservoir is formed in the top of said container and the pressure sensitive means is a one-way check valve.

3. A device cooperating with the flush tank of a toilet bowl or the like for dispensing a deodorant liquid in accordance with claim 2 wherein the pressure and vacuum establishing means is an open drain tube vertically disposed inside said container with its upper end above the bottom of the reservoir and including removable cap means to charge said container with deodorant crystals.

4. A device for metering a deodorant liquid into the flush tank of a toilet bowl and the like as the tank is filled comprising, in combination, an enclosed container including a supply of water soluble deodorant crystals and water, means to support the container in a flush tank whereby it is submerged when the tank is full and substantially out of the water when the tank is emptied, cap means removable for placing crystals in the container, an open reservoir formed in one side of the top of said container to store water to replace deodorant saturated water discharged from the container during a cycle of operation, a one-way inlet valve operable to connect the reservoir to the container, a dispensing tube depending into the container to the point below the lowest level of liquid therein at one end and terminating at its other end above the top of said reservoir, and an open drain tube supported substantially interior of said container with its upper end terminating alongside and above the bottom of said reservoir and its lower end depending to at least the bottom of said container, whereby the rising water in the tank compresses the air in the drain tube and container to force deodorant saturated liquid out of said container by way of said dispensing tube until hydrostatic equilibrium is established and also fills the reservoir and the receding water in the flush tank flows out of said drain tube to establish a partial vacuum in the drain tube and container which opens said inlet valve so that water in said reservoir replaces the deodorant saturated liquid previously discharged through said dispensing tube.

5. A device associated with a tank for dispensing deodorant liquid comprising, in combination, a container containing a deodorant liquid, first means cooperating with the container to establish a positive pressure in the container each time the level of water in the tank rises around and toward the top of the container, dispensing means associated with said container to dispense deodorant liquid from the container until the positive pressure therein is reduced to a point of hydrostatic equilibrium, recharging means to recharge the dispensing device as the water is caused to flow out of the tank, and said first means and said dispensing means comprising open tubes supported partially interiorly of said container, said recharging means including a reservoir and check valve for controlling fluid communication between said reservoir and said container.

References Cited in the file of this patent

UNITED STATES PATENTS

| | | |
|---|---|---|
| 634,515 | Wade | Oct. 10, 1899 |
| 969,729 | Smith | Sept. 6, 1910 |
| 2,839,763 | Newsom | June 24, 1958 |